US009573284B2

(12) United States Patent
Thwing et al.

(10) Patent No.: US 9,573,284 B2
(45) Date of Patent: Feb. 21, 2017

(54) METHOD AND APPARATUS TO PROPAGATE CRACK GROWTH IN A WORKPIECE

(71) Applicant: Southwest Research Institute, San Antonio, TX (US)

(72) Inventors: Clinton J. Thwing, Bulverde, TX (US); Don E. Mahoney, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 190 days.

(21) Appl. No.: 14/156,057

(22) Filed: Jan. 15, 2014

(65) Prior Publication Data
US 2015/0197024 A1 Jul. 16, 2015

(51) Int. Cl.
*B26D 3/14* (2006.01)
*B26D 1/547* (2006.01)
*B23D 57/00* (2006.01)

(52) U.S. Cl.
CPC ............. *B26D 3/14* (2013.01); *B23D 57/003* (2013.01); *B23D 57/0007* (2013.01); *B26D 1/547* (2013.01); *Y10T 83/0304* (2015.04)

(58) Field of Classification Search
CPC ......... B26D 3/14; B26D 1/547; B26D 1/5475; B26D 1/553; B26F 3/12
USPC ....................................... 83/651.1, 692, 917
See application file for complete search history.

(56) References Cited

U.S. PATENT DOCUMENTS

| | | | | |
|---|---|---|---|---|
| 3,146,675 A * | 9/1964 | Anderson | ............... | B23B 51/05 144/24 |
| 4,164,874 A * | 8/1979 | Cassatt | .................... | G01B 3/00 73/799 |
| 5,964,210 A | 10/1999 | Hodsden | | |
| 6,575,070 B1 * | 6/2003 | Peyerl | ...................... | B26D 1/48 83/614 |
| 6,578,430 B1 * | 6/2003 | Duerr | ........................ | G01L 5/00 73/787 |
| 6,832,538 B1 * | 12/2004 | Hwang | .................... | B26D 1/46 83/651.1 |
| 8,118,075 B2 * | 2/2012 | Sampica | ................ | B26D 1/547 156/711 |
| 8,833,359 B2 * | 9/2014 | Shae | .................. | B23D 57/0007 125/16.02 |
| 9,193,020 B2 * | 11/2015 | Baumeler | .............. | B23H 7/065 |
| 2014/0144421 A1 * | 5/2014 | Chua | ..................... | B26D 1/547 125/21 |

OTHER PUBLICATIONS

Newsletter of the Nondestructive Evaluation Center (NDEC) of the Federal Highway Administration of the U.S. Department of Transportation, vol. 3, Issue 1, Mar. 2010 (4 pgs).

* cited by examiner

*Primary Examiner* — Jason Daniel Prone
*Assistant Examiner* — Richard Crosby, Jr.
(74) *Attorney, Agent, or Firm* — Grossman, Tucker et al

(57) ABSTRACT

A method and apparatus for forming a starter notch along the length of a work-piece for subsequent fatigue testing. The starter notch is formed with a cutting wire such that it will promote fatigue-cracking in the work-piece in one defined direction and avoids cracking in directions other than the length direction of the starter notch. Improved fatigue-testing analysis may therefore be realized.

22 Claims, 4 Drawing Sheets

METHOD AND APPARATUS TO PROPAGATE CRACK GROWTH IN A WORKPIECE

STATEMENT OF GOVERNMENT SPONSOR

This invention was made with government support under contract no. FA7000-10-D-0014 awarded by the United States Air Force. The government has certain rights in the invention.

FIELD

The present disclosure relates to methods and devices to develop a fatigue-crack in a work-piece, such as an aircraft structure, which may then be used to evaluate nondestructive inspection technologies.

BACKGROUND

In order to better evaluate nondestructive inspection (NDI) technologies, it is advantageous to develop real, as opposed to simulated, fatigue-cracks in test structures, such as aircraft test structures, to expedite review of such NDI technologies. However, fatigue-cracks may be understood to be difficult and time consuming to initiate, and prior methods of initiation often do not result in satisfactory results.

In order to initiate a fatigue-crack, a starter notch may be formed in the structure. Saw cuts formed with a blade were initially evaluated for the starter notches, but are too large to be useful, particularly as a starter notch often needs to be on the order of about 0.005 inch in width, and about 0.010 inch penetration into the workpiece.

More recently, a process that is often used to obtain very small starter notches is electric discharge machining (EDM). This approach has been widely used for producing starter notches in aircraft structures such as aluminum, titanium, steel, and other aircraft metal.

However, it has been recently determined that when attempting to produce a very small and tight fatigue-crack using the EDM starter notches, the fatigue-crack grows in directions that are not along the major axis of the EDM starter notch. While not being bound to a particular theory, one explanation for the cause of this phenomenon is that the EDM process creates small micro cracking along the edges of the EDM notch and when fatiguing stress is applied to the EDM notch, the micro cracks grow along the orientation of the micro cracking and not the major axis of the EDM notch. Another theory is that the high temperature of the electrical arc induces a change is the morphology of the metal structure. As such, methods and devices are needed to produce started notches in fatigue test structures which will result in a more natural growing of fatigue-cracks.

SUMMARY

A method for forming a starter notch in a work-piece comprising providing a cutting wire having a first end portion and a second end portion wherein the work-piece has a thickness and engaging the work-piece with the cutting wire and forming a starter notch at least partially along the thickness and into said work-piece to define a penetration length direction of the starter notch. The starter notch promotes fatigue-cracking in the work-piece from the notch and in a direction extending along the penetration length wherein the fatigue cracking occurs within a region of +/−5 degrees of the penetration length direction of the starter notch. Furthermore, no cracking occurs within the region of greater than 5 degrees to 90 degrees of the penetration length direction of the starter notch.

In addition, the method herein may be achieved via use of a relatively small, lightweight, portable wire cutting apparatus which may form a starter notch in a work-piece with a cutting wire, which then may be used to initiate a subsequent fatigue-crack in the work-piece, such as an aluminum aircraft fatigue testing coupon. The orientation of the notch may be changed by adjusting the cutting angle of the cutting wire. The cutting apparatus may utilize a diamond impregnated wire guided by pulleys within a housing. A position of at least one of the wire guide pulleys may be adjustable to accomplish the change in cutting angle of the cutting wire.

In certain embodiments, the wire cutting apparatus may comprise a cutting wire having a first end portion and a second end portion, wherein a weight is coupled with the first end portion of the cutting wire; a housing operable with the cutting wire and a work-piece, wherein the housing includes a work-piece receiving opening and a plurality of pulleys arranged in series, wherein the plurality of pulleys comprise a first guide pulley, a second guide pulley and a third guide pulley; wherein the cutting wire is introduced onto the first guide pulley, thereafter routed from the first guide pulley through a fully enclosed hole formed in the work-piece and onto the second guide pulley, and thereafter routed from the second guide pulley onto the third guide pulley, and wherein the cutting wire is oriented after the third pulley such that the weight coupled with the first end portion of the cutting wire is vertically suspended from the third guide pulley. At least one of the first guide pulley and the second guide pulley position the cutting wire such that, when at least a portion of a length of the cutting wire is moved through the thru-hole of the work-piece, the cutting wire cuts a notch in the fully enclosed thru-hole, wherein the notch extends outward from the thru-hole.

FIGURES

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to the figures, there is shown a wire cutting apparatus 2, which may particularly be used to form a notch 120 in a work-piece 100, to initiate one or more subsequent fatigue-cracks in the work-piece 100 according to the present disclosure. In certain embodiments, work-piece 100 may be a testing coupon having a predetermined size. More particularly, the testing coupon may be a fatigue-testing coupon such as an aluminum (aircraft grade) fatigue-testing coupon. Even more particularly, the fatigue-testing coupon may have a length of up to 20 inches, a width of up to 4 inches and a thickness in a range of 0.3 inch to 0.7 inch. One preferred fatigue-testing coupon may have a thickness of 0.42 inch. However, it should be understood that such dimensions of the coupon are merely exemplary and not particularly limiting of the disclosure.

Figure 1:
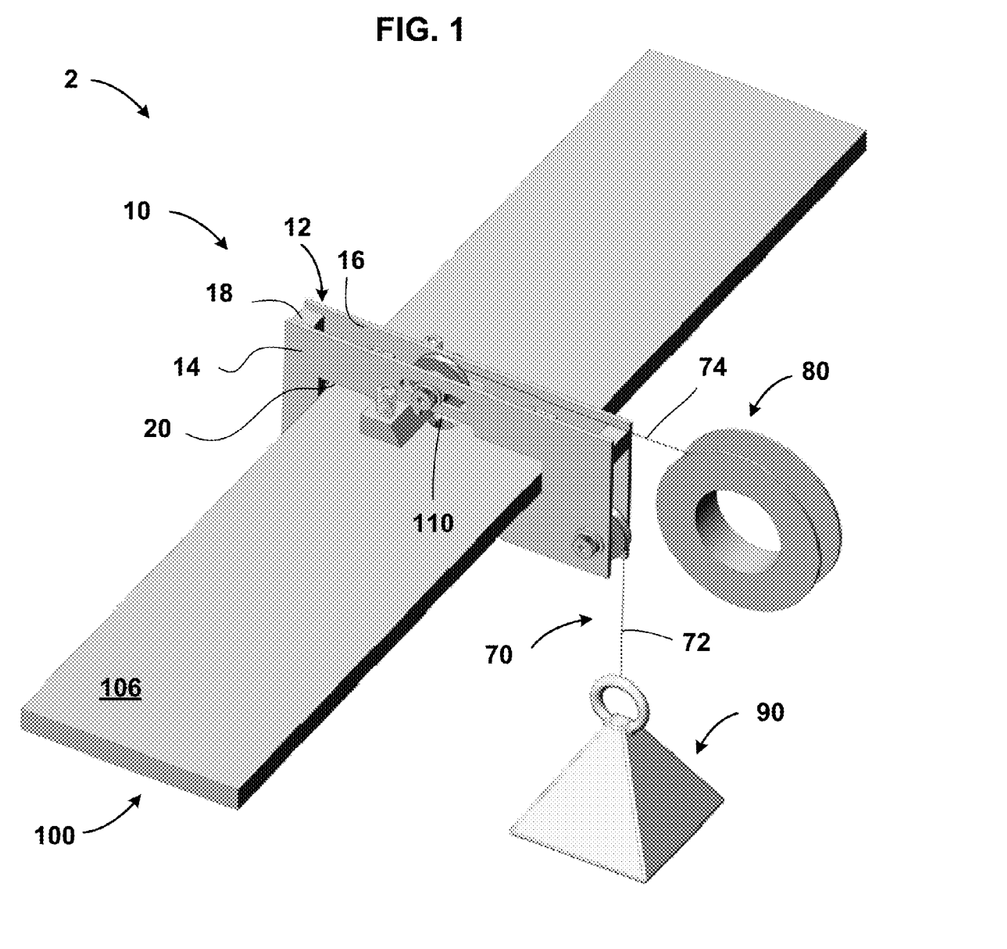
FIG. 1 is an isometric illustration of a wire cutting apparatus according to the present disclosure installed on a work-piece in the form of a testing coupon.
Figures 2, 3:
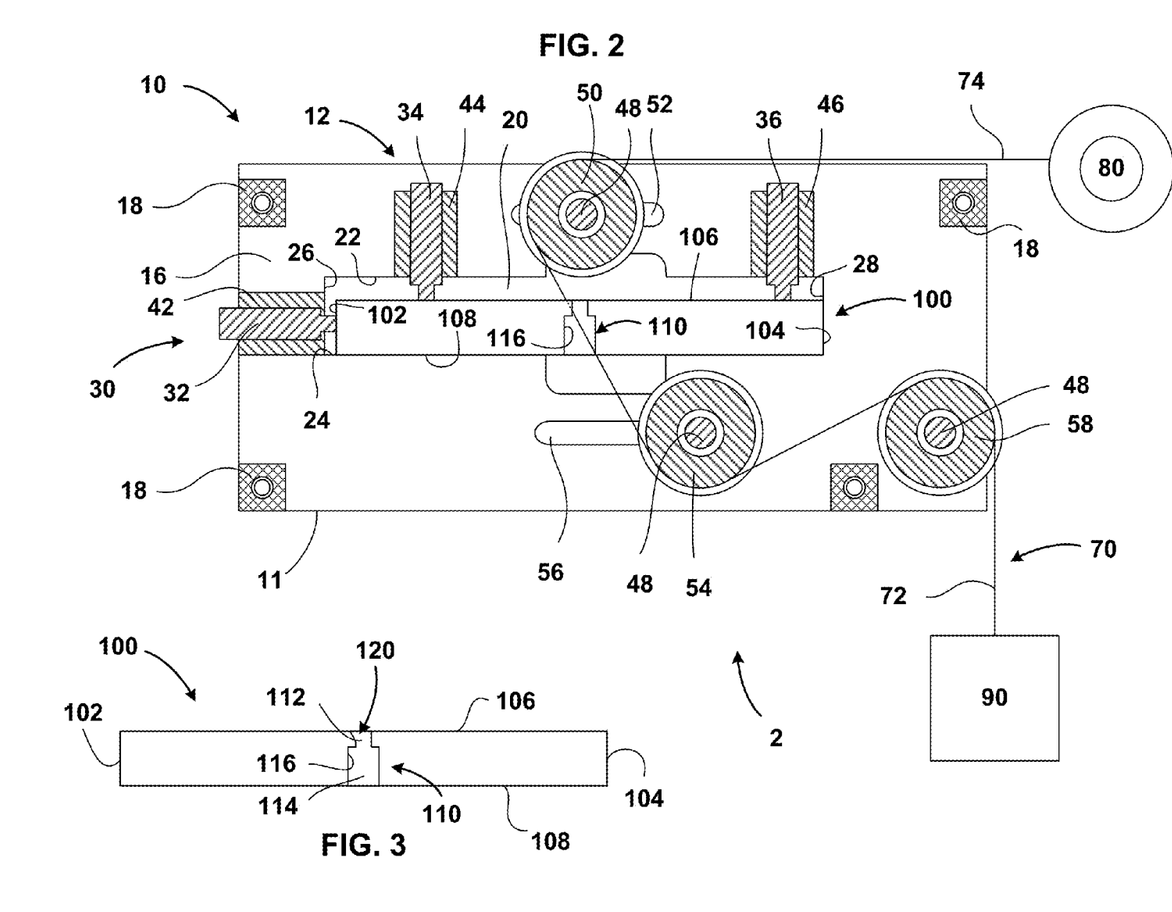
FIG. 2 is a cross-sectional view taken through the longitudinal centerline of the wire cutting apparatus of FIG. 1 installed on the work-piece such that a centerline of a wire groove of three wire guide pulleys of the wire cutting apparatus line up with a center of a hole in the work-piece.
FIG. 3 is a cross-sectional side view of the work-piece of FIG. 1 with a starter notch formed in the work-piece according to one embodiment of the disclosure.

As shown by FIGS. 1 and 2, wire cutting apparatus 2 may comprise a rectangular housing 10, which is operable with a cutting wire 70 and a work-piece 100, as explained in greater detail below. When in use, a bottom (horizontal base) side 11 of housing 10 may be arranged on a horizontal planar platform, such as a table, such that the wire cutting apparatus 2 may be more easily used in the orientation shown in the figures. The wire cutting apparatus 2 may also be held in a vise or other clamping mechanism to maintain proper orientation.

Housing 10 may comprise a support frame 12 including two opposing rectangular side plates 14, 16 which extend parallel to one another and may be mirror images of one another. Plates 14, 16 may be formed of metal, such as steel or aluminum. Plates 14, 16 may have a length of about 5.5 inches, a height of about 2.75 inches and a thickness in a range of 0.08 inch to 0.12 inch. However, it should be understood that such dimensions are merely exemplary and not particularly limiting of the disclosure The foregoing dimensions may be particularly desirable to make the wire cutting apparatus 2 handheld and manipulated. With the foregoing dimensions of plates 14, 16, the wire cutting apparatus 2, and particularly the housing 10 may have an overall weight of less than or equal to 2 pounds, and more particularly less than or equal to 1 pound, depending on the specific materials and thicknesses. However, it should be understood that the wire cutting apparatus 2 may be much larger, depending on the size of the work-piece 100 to be worked upon.

Plates 14, 16 may be narrowly separated from one another by a plurality of localized spacers 18 located there between. The spacers 18 may be particularly located adjacent the corners of the plates 14, 16, to better ensure the plates remain parallel to one another. Spacers 18 may separate the plates 14, 16 from one another by about 0.125 inch to 0.5 inch. Plates 14, 16 may be assembled by bolts which extend through the plates 14, 16 and the spacers 18 and which art tightened with a locknut.

Housing 10 includes a work-piece receiving opening 20 which extends through the plates 14, 16, and more particularly through the width of the housing 10 defined by the thickness of plates 14, 16 and spacers 18. Work-piece receiving opening 20 is configured and arranged to receive a work-piece 100 therein, such that the work piece 100, when located therein, may extend through the work-piece receiving opening 20 from one longitudinal side to the opposing longitudinal side of the housing 10 of wire-cutting apparatus 2.

Work-piece receiving opening 20 is shown as a fully enclosed rectangular opening defined by two sets for opposing side walls, shown as horizontal side walls 22, 24 and vertical side walls 26, 28. As shown, work-piece receiving opening 20 extends longitudinally with a longitudinal axis of the housing 10, and more particularly has a longitudinal length which extends parallel with the bottom side 11 of the housing 10.

While work-piece receiving opening 20 is shown to be a fully enclosed rectangular opening, it should be understood that the opening 20 need not necessarily be fully enclosed or rectangular. The size and shape of the work-piece receiving opening 20 will depend on the size and shape of the work-piece 100 to be acted upon by the wire cutting apparatus 2. For the present embodiment, the work-piece 100 is shown to have a rectangular cross-section, thus the simplest geometry to accommodate the work-piece 100 is that of a rectangle as may be understood from the disclosure below.

As shown by FIG. 2, after the work-piece 100 is placed into and passes through work-piece receiving opening 20, the work-piece 100 may be held in a stationary (fixed) position within the work-piece receiving opening 20 by the wire cutting apparatus 2. More particularly, the wire cutting apparatus 2 may include an adjustable work-piece securing mechanism 30 to secure the wire cutting apparatus 2 and work-piece 100 in place, particularly the housing 10 and the work-piece 100 relative to one another. As shown, the adjustable work-piece securing mechanism 30 may extend laterally into and retract laterally out of the work-piece receiving opening 20 from one or more of side walls 22, 24, 26, 28 to adjust for different size work-pieces 100.

As shown, the work-piece securing mechanism 30 may comprise a plurality of set screws 32, 34, 36 located between the plates 14, 16 which secure the work-piece 100 within the work-piece receiving opening 20. Set screw 32 may be used to secure (e.g. clamp) the work-piece 100 vertically between the vertical (right) wall 28 and the end of the set screw 32 as the set screw 32 is tightened towards and into contact with the vertical (left) surface 102 of the work-piece 100 and vertical (right) surface 104 of work-piece 100 is brought into intimate contact with vertical (right) wall 28 of the work-piece receiving opening 20.

In addition, set screws 34 and 36 may be used to secure (e.g. clamp) the work-piece 100 horizontally between horizontal (lower) wall 24 and the end of set screws 34, 36 as the set screws 34, 36 are tightened towards and into contact with the horizontal (upper) surface 106 of the work-piece 100 and horizontal (lower) surface 108 of the work-piece 100 is brought into intimate contact with horizontal (lower) wall 24 of the work-piece receiving opening 20.

Thus, the securing mechanism 30 may be understood to secure the wire cutting apparatus 2, particularly the housing 20 thereof, and the work-piece 100 relative to one another in two directions perpendicular to one another, here horizontal and vertical.

In certain embodiment, the distal ends of the set screws 32, 34 and 36 may be made of a resilient plastic, such as nylon, which bears against the work piece 100 without cutting or otherwise damaging the work-piece 100 by virtue of having a lower hardness than the work-piece 100.

Set screws 32, 34, 36 may be positioned to operate via threaded engagement with female threaded bushings 42, 44, and 46. As shown, set screws 32, 34, 36 may be threaded into female threaded bushings 42, 44, 46 which may be attached to the inside surfaces of one or both of plates 14, 16. The bushings 42, 44, 46 may alternatively fit within a pocketed recess in each plate 4, 16.

Wire cutting apparatus 2 further comprises a plurality of wire guide pulleys 50, 54 and 58 located between plates 14, 16. As shown, wire guide pulleys 50, 54 and 58 may be arranged in series, all be of the same (equivalent) diameter, and all have a V-shaped guide track. Pulleys 50, 54 and 58 may have a diameter in a range of 0.5 inch to 2 inches, and more particularly have a diameter in a range of 0.75 inch to 1.5 inches.

As shown, wire guide pulleys 50 and 54 are arranged on opposing longitudinal sides of work-piece receiving opening 20 and work-piece 100. Furthermore, when wire cutting apparatus 2 is oriented as shown in FIG. 2, wire guide pulley 50 is located above work-piece receiving opening 20 and work-piece 100, while wire guide pulley 54 is located below work-piece receiving opening 20 and work-piece 100. Furthermore, wire guide pulley 58 is located laterally rearward of wire guide pulley 54.

Once work-piece 100 has been properly fastened to wire cutting apparatus 2, a cutting wire 70 may be threaded through wire cutting apparatus 2. As shown, a first end portion 72 of the cutting wire 70 may be removed from a wire spool 80 and introduced onto first (upper) wire guide pulley 50 by being routed over the top of pulley 50, while the opposing end portion 74 may remain coupled with the spool 80.

End portion 72 of the cutting wire 70 may then be routed from the first wire guide pulley 50 down through a fully enclosed, pre-formed (e.g. drilled) circular/cylindrical thru-hole 110 formed in work-piece 100. As used herein, a fully enclosed thru-hole may be understood as a thru-hole having a sidewall defined by the work-piece 100 which extends continuously around the perimeter of the hole (i.e. 360 degrees). As shown by FIGS. 2 and 3, thru-hole 110 may be a counter-bored thru-hole, i.e. one portion 112 of the thru-hole 110 may have a smaller diameter than another portion 114 of the thru-hole 110. Thru-hole 110 may also be a tapered thru-hole, to simulate a hole to contain a threaded fastener with a tapered head (e.g. countersunk head such as flat 82°, flat 100°, flat trim; flat undercut, oval, oval undercut, oval trim, round countersunk, double countersunk head; bugle head).

Cutting wire 70 is then routed onto second (lower) wire guide pulley 54, by being routed under the bottom of pulley 54, and routed onto third wire guide pulley 58, by being routed over the top of pulley 58. As shown, the third wire guide pulley 58 is arranged such that, when a hanging weight 90 is coupled with the first end portion 72 of cutting wire 70, the hanging weight 90 is suspended vertically from the third guide pulley 58. Stated another way, the cutting wire 70 is oriented after the third pulley 58 such that the hanging weight 90 coupled with the first end portion 72 of the cutting wire 70 is vertically suspended from the third guide pulley 58.

In certain embodiments, cutting wire 70 may be a diamond impregnated wire having a diameter in a range of 100 to 500 microns. More particularly, the cutting wire 70 may have diameter in a range of 110 to 200 microns. More particularly, the cutting wire 70 may have diameter in a range of 120 to 160 microns, such as 140 microns. Also, it should be understood that the cutting wire 70 is a mechanical cutting wire which relies upon mechanical cutting of the work-piece 100, and the cutting wire 70 is not electrically heated or charged during use of the wire cutting apparatus 2.

As explained in greater detail below, at least one of the first wire guide pulley 50 and the second wire guide pulley 54 are arranged relative to the work-piece 100 such that the cutting wire 70 is positioned to cut a notch 120 in the fully enclosed thru-hole 110 of the work-piece 100, particularly by moving at least a portion of a length of the cutting wire 70 through the thru-hole 110 and simultaneously cutting the notch 120 in the thru-hole 100 which extends outward from the thru-hole 110. Stated another way, at least one of the first wire guide pulley 50 and the second wire guide pulley 54 position the cutting wire 70 such that, when at least a portion of a length of the cutting wire 70 is moved through the thru-hole 110 of the work-piece 100, the cutting wire 70 cuts a notch 120 in the fully enclosed thru-hole 110, wherein the notch 120 extends outward from the thru-hole 100.

Before or after the cutting wire 70 has been routed through the wire guide pulleys 50, 54, 58, a horizontal position (X-direction) of at least one of wire guide pulleys 50 and 54 may be horizontally adjusted relative to the position of the work-piece receiving opening 20 (i.e. along a longitudinal length of the work-piece receiving opening 20) and the thru-hole 110 in wire-piece 100, particularly by moving the wire guide pulley 50 and/or 54 in horizontal elongated (slotted) adjustment opening 52 and/or 56, respectively.

The horizontal position of at least one of the wire guide pulleys 50 and 54 may be adjusted to bring the cutting wire 70 into better contact with the surface of vertical thru-hole 110. Furthermore, the horizontal position of at least one of the wire guide pulleys 50 and 54 may be adjusted to change the angle of the cutting wire 70 relative to the work-piece receiving opening 20 (i.e. along a longitudinal length of the work-piece receiving opening 20) and the work-piece 100 to provide a notch 120 at any angle between 0 degrees (i.e. notch 120 cut parallel to the longitudinal axis of thru-hole 110 and perpendicular to the upper surface 106 and/or lower surfaces 108 of the work-piece 100) and 45 degrees (notch 120 cut at 45 degrees to the longitudinal axis of thru-hole 110, which for the shown embodiment, is also 45 degrees relative to the upper surface 106 and lower surface 108 of the work-piece).

The horizontal position of at least one of the wire guide pulleys 50 and 54 may be adjusted by loosening a mechanical fastener 48, e.g. locknut of a threaded shoulder screw extending through the center axis of the wire guide pulleys 50 and 54 and thereafter sliding the wire guide pulleys 50 and 54 within horizontal elongated (slotted) adjustment opening 52 and 56.

Once a proper position of the wire guide pulleys 50 and 54 has been established, the mechanical fastener 48 may be re-tightened to fix the position of the wire guide pulleys 50 and 54 relative to the work-piece receiving opening 20 (along a longitudinal length of the work-piece receiving opening 20) and the work-piece 100. Thus, the position of at least one of the wire guide pulleys 50 and 54 is fixable, as well as adjustable, anywhere along the length of horizontal elongated (slotted) adjustment openings 52 and 56, respectively. Thus, wire guide pulleys 50 and 54 may be adjusted for the desired proper angle and depth of the cut in the work-piece 100 for testing coupon notch specifications. A template or protractor may used to set the angle and depth of cut for the notch 120.

Unlike wire guide pulleys 50 and 54, wire guide pulley 58 is shown to have a fixed position. However, the position of wire guide pulley 58 could also be made fixable and adjustable with use of an elongated adjustment opening.

With use of a cutting wire having a diameter of 140 microns, the width of the notch 120 can be maintained at about 0.006 inch in width with a tolerance +/−0.001 inch. As may be explained below, the notch 120 may have a penetration length into the workpiece 0.001 inch to 0.009 inch. Furthermore, as explained below, the notch 120 may be formed by various methods of moving the cutting wire 70.

In certain embodiments, once the cutting wire 70 is bearing against the inner surface 116 of thru-hole 110, moving at least a portion of the length of the cutting wire 70 through the thru-hole 110 to cut a notch 120 in the thru-hole 110 may be performed by releasing the hanging weight 90 and pulling the cutting wire 70 through the thru-hole 110 with the hanging weight 90 falling under gravity. Releasing the hanging weight 90 may be performed by severing the cutting wire 70 from the spool 80 at a suitable distance from the first pulley 50 which is greater than the vertical drop to be experienced by hanging weight 90, or by simply allowing the spool to rotate and unspool additional cutting wire 70 in response to the falling of weight 80. The weight 90 may have a mass of about 0.5 pounds which, when falling due to gravity, may create a downward force of about 2.2 Newtons.

In the foregoing instance, other than air resistance, the hanging weight 90 may fall against a biasing force of merely the resistance (friction) of the cutting wire 70 engaging with the work-piece 100 and the pulleys 50, 54 and 58. However, in other embodiments, pulling the cutting wire 70 through the thru-hole 110 with the hanging weight 90 falling under gravity may be performed against an additional biasing force applied to the cutting wire 70 at the second end portion 74 of the cutting wire 70, which will slow down the rate of decent of the hanging weight 90.

In certain embodiments, rather than the notch 120 being formed by the cutting wire 70 traveling downward through the thru-hole 110, the notch may be formed by the cutting wire 70 traveling upward through the thru-hole 110. In such an instance, moving at least a portion of the length of the cutting wire 70 through the thru-hole 110 may be performed by pulling the cutting wire 70 through the thru-hole 110 with an actuation force applied at the second end portion 74 of the cutting wire 70. Such actuation force may be applied by an actuator moving the second end portion 74 of the cutting wire 70 horizontally away from the housing 10, such as by a linear actuator. In certain embodiments, pulling the cutting wire 70 through the thru-hole 110 with a force applied at the second end portion 74 of the cutting wire 70 may be performed against a biasing force applied to the cutting wire 70 by the hanging weight 90 coupled with the first end portion 72 of the cutting wire 70. In such instance, the actuation force having to be greater than resistance provided by the hanging weight 90 may increase the penetration length of notch 120 for a given length of the cutting wire 70 through the thru-hole 110.

In both the foregoing situations, moving at least a portion of the length of the cutting wire 70 through the thru-hole 110 and simultaneously cutting a notch 120 in the thru-hole 110 which extends outward from the thru-hole 110 may be performed by moving the cutting wire 70 through the thru-hole 110 in only one direction, either downwards or upwards.

However, it certain other embodiments, moving at least a portion of the length of the cutting wire 70 through the thru-hole 110 and simultaneously cutting a notch 120 in the thru-hole 110 which extends outward from the thru-hole 110 may be performed by moving the cutting wire 70 through the thru-hole 110 in alternating opposing directions, such as provided by reciprocating motion.

In certain embodiments, once the cutting wire 70 is bearing against the inner surface 116 of thru-hole 110, the wire spool 80 may be moved with reciprocating horizontal motion for cutting wire 70 to cut a notch 120 in work-piece 100, such as slowing pulling (retracting) the cutting wire 70 by hand and thereafter releasing the retracted cutting wire 70 under the force of hanging weight 90. Such may also be performed by inhibiting the spool 80 from rotating and moving the spool 80 back and forth horizontally with reciprocating motion.

In still other embodiments, the length of cutting wire 70 may be slowly removed from the wire spool 80 during the reciprocating movement to better ensure that the same portion of the cutting wire 70 is not continually used for cutting, which could result in breaking of the cutting wire 70 at such location, or decreased cutting ability of the cutting wire 70 should the cutting wire 70 exhibit wear as such location.

The foregoing wire cutting apparatus 2 may provide a relatively low cost, relatively small, lightweight, portable wire cutting apparatus 2 capable of cutting a 0.006+/−0.001 inch wide notch to initiate a fatigue-crack in a work-piece 100, such as an aluminum aircraft fatigue testing coupon, at any angle adjustable from 0 degree (vertical) to 45 degree relative to the work-piece 100. The wire cutting apparatus 2 may utilize a diamond impregnated wire of 140 microns in diameter guided by three pulleys 50, 54, 58 within a housing 10. A position of at least one of the wire guide pulleys 50, 54 may be adjustable to accomplish the change in cutting angle.

The foregoing wire cutting apparatus may be used to create a notch 120 to initiate a fatigue-crack in a work-piece 100. Once the notch 20 is formed, work-piece 100 may be subjected to fatigue stress to initiate and propagate a fatigue-crack in the work-piece 100 which extends outward from the notch 120.

After such fatigue testing the thru-hole 110 in the work-piece 100 may be enlarged such that the notch 120 is removed from the work-piece 100 while at least a portion of the fatigue-crack remains in the work-piece 100. For example, the thru-hole 110 may have an initial diameter of about 0.240 inch, the notch 120 may have a penetration length extending outward from the thru-hole 110 of less than 0.009 inch, and a stress-crack may have a length extending outward from the notch at least another 0.005 inch. The thru-hole 110 in the work-piece 100 may then be enlarged to a diameter of 0.260 inch, in which case the notch is completely removed from the work-piece 100 while at least a portion of the fatigue-crack remains in the work-piece 100. The fatigue-crack may then be enlarged by further fatigue cycling of the work-piece 100 and/or the fatigue-crack in the work-piece 100 may be reviewed with one or more fatigue-crack detection technologies.

Figure 4:
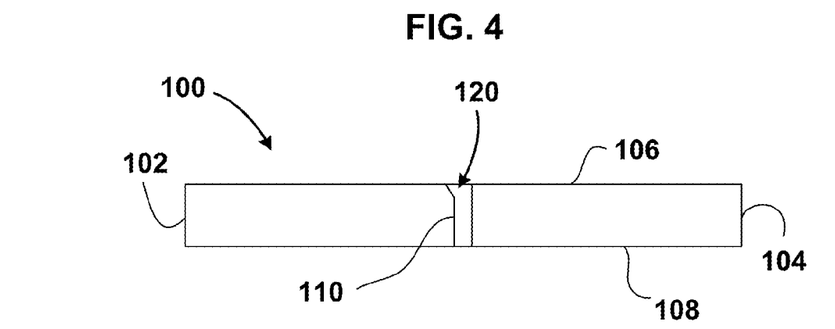
FIG. 4 is a cross-sectional side view of the work-piece of FIG. 1 with a starter notch formed in the work-piece according to another embodiment of the disclosure.
Figure 5:
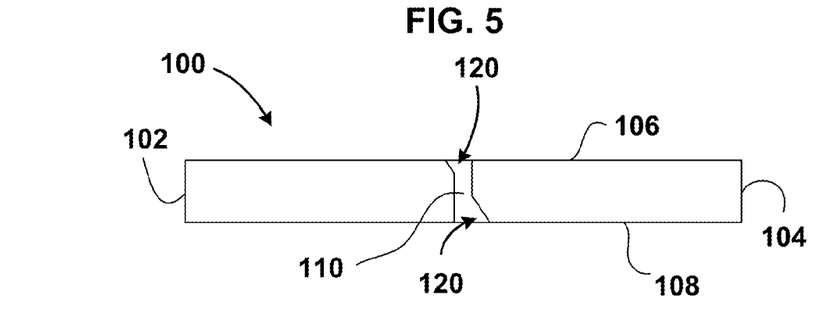
FIG. 5 is a cross-sectional side view of the work-piece of FIG. 1 with a starter notch formed in the work-piece according to another embodiment of the disclosure.
Figure 6:
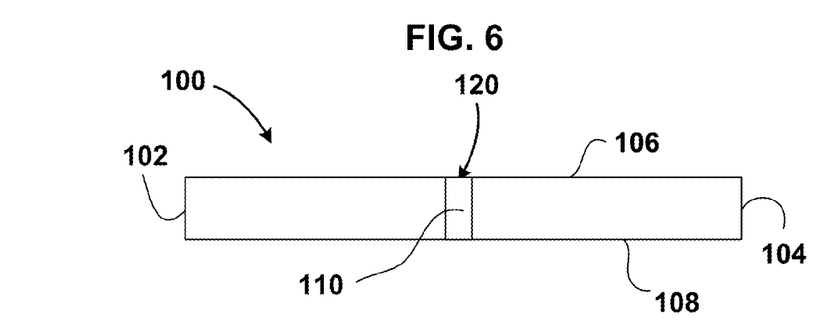
FIG. 6 is a cross-sectional side view of the work-piece of FIG. 1 with a starter notch formed in the work-piece according to another embodiment of the disclosure.
Figure 7:
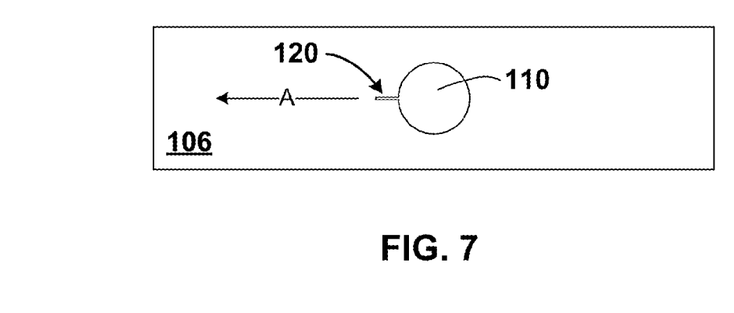
FIG. 7 is a top view of the work-piece of FIG. 1, with an enlarged thru-hole and starter notch formed therein.

FIGS. 4-7 illustrate different notches 120 which may be formed with the wire-cutting apparatus 2. FIG. 4 shows a notch 120 formed in a thru-hole 110 having a constant diameter through the thickness of the work-piece 100, and which does not have a counter-bore. FIG. 5 shows two notches 120 formed at both ends of the thru-hole 100 on opposing sides 106, 108 of the work-piece, as well as the two notches 120 having different sizes. FIG. 6 shows a notch 120 which extends completely through the thickness of the work-piece 100. FIG. 7 shows an enlarged exemplary top view of notch 120 as such would appear for embodiments of FIGS. 3-6.

Figure 8:
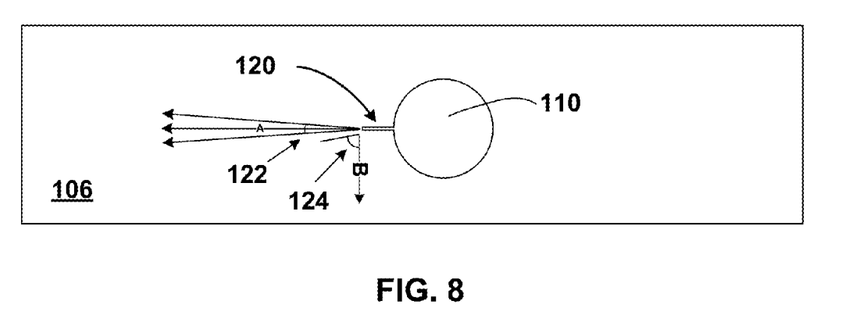
FIG. 8 is a top view of the work-piece of FIG. 1 illustrating the cracking during fatigue testing.

Accordingly, the present disclosure now provides for an apparatus and method that will form a starter notch in a work-piece wherein the starter notch is such that, upon application of stress, the starter notch promotes the formation of cracking along the axis (penetration length direction) of the notch (i.e. the major axis). Cracking along an axis other than the major axis is therefore reduced or avoided. With reference to FIG. 8, the direction of cracking along the major axis of the notch is identified with arrow A, which axis as illustrated may be understood as a linear direction extending in the same direction as the notch (penetration length direction). However, while, as noted, the formation of the notch 120 herein is such that cracking does not occur in other directions, and in particular at directions that are perpendicular to the penetration length direction (see arrow B) it can be appreciated that the direction of arrow A may vary +/−5 degrees from the penetration length direction. Such variation of +/−5 degrees is illustrated by the angle shown at 122 (although not drawn to precise scale), where such angle is measures at a location that is within 5 mm of the notch.

Therefore, all cracking from the notch which is initiated in ensuing fatigue testing occurs only in the general direction of arrow A which cracking may occur within a region of +/−5 degrees from the penetration length direction of the starter notch in the work-piece with no cracking outside of this region. In more preferred embodiment, the variation may occur within a region of +/−4 degrees, +/−3 degrees, +/−2 degrees and +/−1 degree. In such regard, it may be appreciated that cracking during fatigue testing is avoided in the region of greater than 5 degrees to 90 degrees (angle 124) as illustrated by arrow B in FIG. 8.

As alluded to above, the starter notch is preferably formed by the use of a cutting wire having a diameter in a range of 100 microns to 500 microns. The cutting wire is preferably a diamond impregnated cutting wire. Such wires generally comprise a relatively high tensile strength steel core with a surrounding metallic sheath (e.g. Cu) into which relatively small diamonds (on the order of between 20 to 120 microns) are embedded. Particularly preferred diamond wires are available from Diamond Wire Material Technologies (DMT), Colorado Springs, product designation R011114055. The starter notch that is formed preferably has a penetration length of 0.001 inch, 0.002 inch, 0.003 inch, 0.004 inch, 0.005 inch, 0.006 inch, 0.007 inch, 0.008 inch and 0.009 inch. The work-piece may preferably have a thickness of 0.30 inch, 0.40 inch, 0.50 inch, 0.60 inch and 0.70 inch. Therefore it may be appreciated that the starter notch may preferably have a penetration depth that extends completely or partially through the thickness of the work-piece from the horizontal upper surface 106 to the horizontal lower surface 108.

While preferred embodiments of the present invention(s) have been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

REFERENCE CHARACTERS 2 wire cutting apparatus
10 housing
11 bottom side
12 support frame
14 plate
16 plate
18 spacers
20 work-piece receiving opening
22 work-piece receiving opening horizontal wall
24 work-piece receiving opening horizontal wall
26 work-piece receiving opening vertical wall
28 work-piece receiving opening vertical wall
30 work-piece securing mechanism
32 set screw
34 set screw
36 set screw
42 screw bushing
44 screw bushing
46 screw bushing
48 mechanical fastener
50 pulley
52 adjustment opening
54 pulley
56 adjustment opening
58 pulley
70 cutting wire
72 first end portion
74 second end portion
80 spool
90 weight
100 work-piece
102 work-piece vertical surface
104 work-piece vertical surface
106 work-piece upper surface
108 work-piece lower surface
110 thru-hole
112 small diameter of thru-hole
114 large diameter of thru-hole
116 inner surface of thru-hole
120 notch
122 angle
124 angle

What is claimed is:
1. A method for forming a starter notch in a work-piece comprising:
  providing a cutting wire;
  supplying said work-piece having a thickness and engaging said work-piece with said cutting wire and forming a starter notch at least partially along the thickness and into said work-piece to define a penetration length direction of said starter notch;
  providing a wire cutting apparatus, including said cutting wire having a first end portion and a second end portion, wherein a weight is coupled with the first end portion of the cutting wire;

a housing, wherein the housing includes a work-piece receiving opening and a plurality of pulleys arranged in series, wherein the plurality of pulleys comprise a first guide pulley, a second guide pulley and a third guide pulley;

introducing the cutting wire onto said first guide pulley;

routing the cutting wire from the first guide pulley through a fully enclosed hole formed in the work-piece and onto said second guide pulley;

routing the cutting wire from the second guide pulley onto a third guide pulley;

arranging the third pulley such that the weight coupled with the first end portion of the cutting wire is suspended from the third guide pulley;

arranging at least one of the first guide pulley and the second guide pulley such that the cutting wire is positioned to cut said starter notch in the fully enclosed thru-hole of the work-piece;

moving at least a portion of a length of the cutting wire through the thru-hole and simultaneously cutting said starter notch in the thru-hole which extends outward from the thru-hole; and wherein said starter notch is configured to promote fatigue-cracking in said work-piece from said notch in a direction extending along said penetration length within a region of +/−5 degrees of said penetration length direction of said starter notch, without said fatigue-cracking within a region of greater than 5 degrees to 90 degrees of said penetration length direction of said starter notch.

2. The method of claim 1 wherein said thru-hole has an inner surface and said cutting wire forms said starter notch on said inner surface.

3. The method of claim 1 wherein said cutting wire has a diameter of 100 microns to 500 microns.

4. The method of claim 1 wherein said starter notch penetrates into said work-piece to provide a penetration length of up to 0.009 inches.

5. The method of claim 1 wherein said work-piece has a thickness of 0.3 inches to 0.7 inches.

6. The method of claim 1 wherein said work-piece has a length of up to 20 inches.

7. The method of claim 1 wherein said work-piece has a width of up to 4 inches.

8. The method of claim 1 wherein:
moving at least a portion of the length of the cutting wire through the thru-hole is performed by pulling the cutting wire through the thru-hole with the weight falling under gravity.

9. The method of claim 1 wherein:
moving at least a portion of the length of the cutting wire through the thru-hole and simultaneously cutting a notch in the thru-hole which extends outward from the thru-hole is performed by moving the cutting wire through the thru-hole in alternating opposing directions.

10. A method of propagating crack growth in a work-piece comprising:
providing a cutting wire;
supplying said work-piece having a thickness and a thru-hole;
engaging said work-piece in said thru-hole with said cutting wire;
forming a starter notch at least partially along the thickness and into said work-piece to define a penetration length direction of said starter notch;
forming a fatigue-crack in the work piece which extends from the starter notch;
enlargening the thru-hole in the work-piece such that the notch is removed from the work-piece while at least a portion of the fatigue-crack remains in the work-piece.

11. The method of claim 10 further comprising:
reviewing the fatigue-crack in the work-piece with one or more fatigue-crack detection technologies.

12. The method of claim 10 wherein said fatigue-crack is formed in said work-piece in a direction extending along said penetration length within a region of +/−5 degrees of said penetration length direction of said starter notch.

13. The method of claim 12 wherein said fatigue-cracking is not formed within a region of greater than 5 degrees to 90 degrees of said penetration length direction of said starter notch.

14. The method of claim 10 wherein said thru-hole is a fully enclosed thru-hole having an inner surface and said cutting wire forms said starter notch on said inner surface.

15. The method of claim 10 wherein said cutting wire has a diameter of 100 microns to 500 microns.

16. The method of claim 10 wherein said starter notch penetrates into said work-piece to provide a penetration length of up to 0.009 inches.

17. The method of claim 10 wherein said work-piece has a thickness of 0.3 inches to 0.7 inches.

18. The method of claim 10 wherein said work-piece has a length of up to 20 inches.

19. The method of claim 10 wherein said work-piece has a width of up to 4 inches.

20. The method of claim 10 further comprising:
providing a wire cutting apparatus, including said cutting wire having a first end portion and a second end portion, wherein a weight is coupled with the first end portion of the cutting wire;
a housing, wherein the housing includes a work-piece receiving opening and a plurality of pulleys arranged in series, wherein the plurality of pulleys comprise a first guide pulley, a second guide pulley and a third guide pulley;
introducing the cutting wire onto said first guide pulley;
routing the cutting wire from the first guide pulley through a fully enclosed hole formed in the work-piece and onto said second guide pulley;
routing the cutting wire from the second guide pulley onto a third guide pulley;
arranging the third pulley such that the weight coupled with the first end portion of the cutting wire is suspended from the third guide pulley;
arranging at least one of the first guide pulley and the second guide pulley such that the cutting wire is positioned to cut said starter notch in the fully enclosed thru-hole of the work-piece; and
moving at least a portion of a length of the cutting wire through the thru-hole and simultaneously cutting said starter notch in the thru-hole which extends outward from the thru-hole.

21. The method of claim 20 wherein:
moving at least a portion of the length of the cutting wire through the thru-hole is performed by pulling the cutting wire through the thru-hole with the weight falling under gravity.

22. The method of claim 20 wherein:
moving at least a portion of the length of the cutting wire through the thru-hole and simultaneously cutting a notch in the thru-hole which extends outward from the thru-hole is performed by moving the cutting wire through the thru-hole in alternating opposing directions.

\* \* \* \* \*